United States Patent
Kim (10) Patent No.: US 8,988,853 B2
(45) Date of Patent: *Mar. 24, 2015

(54) MULTILAYER CERAMIC CAPACITOR

(75) Inventor: Hyung Joon Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,197

(22) Filed: Apr. 19, 2012

(65) Prior Publication Data

US 2013/0050893 A1 Feb. 28, 2013

(30) Foreign Application Priority Data

Aug. 26, 2011 (KR) .................. 10-2011-0085768

(51) Int. Cl.
| | | |
|---|---|---|
| *H01G 4/005* | (2006.01) | |
| *H01G 4/30* | (2006.01) | |
| *H01G 4/228* | (2006.01) | |
| *H01G 4/12* | (2006.01) | |

(52) U.S. Cl.
CPC ............... *H01G 4/228* (2013.01); *H01G 4/30* (2013.01); *H01G 4/12* (2013.01)
USPC ...................... 361/303; 361/301.4; 361/306.3

(58) Field of Classification Search
CPC .......... H01G 4/232; H01G 4/228; H01G 4/30
USPC ..................... 361/306.1, 303–305, 311, 306.3
See application file for complete search history.

(56) References Cited

U.S. PATENT DOCUMENTS

| | | | | |
|---|---|---|---|---|
| 6,661,640 | B2 * | 12/2003 | Togashi | ..................... 361/306.3 |
| 7,054,137 | B1 * | 5/2006 | Barber et al. | .............. 361/321.1 |
| 7,180,723 | B2 * | 2/2007 | Togashi et al. | ................ 361/303 |
| 7,230,815 | B2 * | 6/2007 | Yoon et al. | .................... 361/303 |
| 7,292,429 | B2 * | 11/2007 | Randall et al. | ............... 361/303 |
| 7,672,112 | B2 * | 3/2010 | Hattori et al. | .............. 361/306.2 |
| 7,701,695 | B2 * | 4/2010 | Sutardja | ..................... 361/306.3 |
| 7,936,554 | B2 * | 5/2011 | Itamura et al. | ................ 361/303 |
| 8,081,485 | B2 * | 12/2011 | Wischnat | ...................... 361/760 |

(Continued)

FOREIGN PATENT DOCUMENTS

| | | | |
|---|---|---|---|
| JP | 01186607 A | * | 7/1989 |
| JP | 07-122455 A | | 5/1995 |

(Continued)

OTHER PUBLICATIONS

Japanese Office Action, w/ English translation thereof, issued in Japanese Patent Application No. JP 2012-094530 dated Sep. 24, 2013.

(Continued)

*Primary Examiner* — Eric Thomas
(74) *Attorney, Agent, or Firm* — McDermott Will & Emery LLP (57) ABSTRACT

There is provided a multilayer ceramic capacitor including: a ceramic body; first and second internal electrodes including respective lead-out portions having an overlapping area, the overlapping area being exposed to one surface of the ceramic body; first and second external electrodes extended from the one surface of the ceramic body to side surfaces thereof in a y-direction, in which the first and second internal electrodes are laminated, and connected to the respective lead-out portions; and an insulation layer formed on the one surface of the ceramic body.

21 Claims, 7 Drawing Sheets

(56) References Cited

U.S. PATENT DOCUMENTS

| | | | |
|---|---|---|---|
| 8,098,478 B2* | 1/2012 | Niki et al. | 361/303 |
| 8,315,033 B2* | 11/2012 | Takashima et al. | 361/303 |
| 2004/0223290 A1 | 11/2004 | Sutardja | |
| 2004/0266087 A1 | 12/2004 | Greier et al. | |
| 2005/0286203 A1* | 12/2005 | Togashi et al. | 361/301.4 |
| 2008/0186652 A1* | 8/2008 | Lee et al. | 361/306.3 |
| 2009/0073634 A1* | 3/2009 | Lee et al. | 361/303 |
| 2010/0149769 A1* | 6/2010 | Lee et al. | 361/768 |

FOREIGN PATENT DOCUMENTS

| | | |
|---|---|---|
| JP | 08-162356 A | 6/1996 |
| JP | 09-055333 A | 2/1997 |
| JP | 10-050547 A | 2/1998 |
| JP | 2004-140183 A | 5/2004 |
| JP | 2005-505129 A | 2/2005 |
| JP | 2006-216622 A | 8/2006 |
| JP | 2008-022017 A | 1/2008 |
| JP | 2009-026872 A | 2/2009 |
| JP | 2009026872 A * | 2/2009 |
| JP | 2009-054973 A | 3/2009 |

OTHER PUBLICATIONS

Office Action issued May 20, 2014 in the corresponding Korean patent application No. 10-2011-0085768.
The Pretrial Re-examination Report dated Sep. 5, 2014 issued in Japanese Patent Application No. 2012-094530 (English translation).
Korean Office Action dated Jan. 12, 2015 issued in Korean Patent Application No. 10-2011-0085768 (English translation).

* cited by examiner

MULTILAYER CERAMIC CAPACITOR

CROSS-REFERENCE TO RELATED APPLICATIONS

This application claims the priority of Korean Patent Application No. 10-2011-0085768 filed on Aug. 26, 2011, in the Korean Intellectual Property Office, the disclosure of which is incorporated herein by reference.

BACKGROUND OF THE INVENTION

1. Field of the Invention

The present invention relates to a multilayer ceramic capacitor, and more particularly, to a multilayer ceramic capacitor having excellent capacitance, low equivalent series inductance (ESL), and excellent strength in adhesion to a circuit board.

2. Description of the Related Art

Generally, electronic components using a ceramic material, such as a capacitor, an inductor, a piezoelectric element, a varistor, or a thermistor, or the like, include a ceramic body made of a ceramic material, internal electrodes formed within the ceramic body, and external electrodes mounted on surfaces of the ceramic body so as to be connected to the internal electrodes.

Among ceramic electronic components, a multilayer ceramic capacitor (MLCC) includes a plurality of laminated dielectric layers, internal electrodes disposed to face each other, in which each pair of internal electrodes has one of the dielectric layers disposed therebetween, and external electrodes electrically connected to the internal electrodes.

The multilayer ceramic capacitor provides the advantages of compactness, high capacitance, and ease of mounting, so it is therefore used extensively in mobile communications devices such as notebook computers, personal digital assistances (PDAs), and cellular phones.

Recently, as electronic products have been miniaturized and multi-functionalized, chip components have also tended to have been miniaturized and multi-functionalized. Accordingly, there is a need to miniaturize the multilayer ceramic capacitor and increase the capacitance thereof.

In addition, the multilayer ceramic capacitor has been usefully used as a bypass capacitor disposed in a large scale integration (LSI) power supply circuit. The multilayer ceramic capacity needs to have the capability to effectively remove high frequency noise in order to serve as a bypass capacitor. This demand has been further increased in accordance with the trend toward electronic devices having high frequencies. The multilayer ceramic capacitor used as the bypass capacitor may be electrically connected to a mounting pad on a circuit board through soldering, and the mounting pad may be connected to other external circuits through wiring patterns on, or conductive vias in, the circuit board.

The multilayer ceramic capacitor has equivalent series resistance (ESR) and equivalent series inductance (ESL) components in addition to a capacitance component. These ESR and ESL components may hinder a function of the bypass capacitor. Particularly, ESL increases capacitor inductance at high frequencies to thereby hinder high frequency noise removal characteristics.

SUMMARY OF THE INVENTION

An aspect of the present invention provides a multilayer ceramic capacitor having excellent capacitance, low equivalent series inductance (ESL), and excellent strength in adhesion to a circuit board.

According to an aspect of the present invention, there is provided a multilayer ceramic capacitor including: a ceramic body; first and second internal electrodes including respective lead-out portions having an overlapping area, the overlapping area being exposed to one surface of the ceramic body; first and second external electrodes extended from the one surface of the ceramic body to side surfaces thereof in a y-direction, in which the first and second internal electrodes are laminated, and connected to the respective lead-out portions; and an insulation layer formed on the one surface of the ceramic body.

The lead-out portions of the first and second internal electrodes may be exposed to the same surface of the ceramic body.

The first and second internal electrodes may be disposed perpendicularly to a mounting surface of the ceramic body.

The first external electrode may be connected to a portion of the lead-out portion of the first internal electrode that does not overlap the lead-out portion of the second internal electrode.

The insulation layer may entirely cover the overlapping area of the lead-out portions of the first and second internal electrodes.

The insulation layer may be formed by applying a ceramic slurry to the ceramic body.

The side surfaces of the ceramic body in the y-direction may oppose each other.

The first external electrode or the second external electrode may not be formed on an end surface of the ceramic body in an x-direction, in which the first and second external electrodes, having a predetermined interval therebetween, are formed.

The first external electrode or the second external electrode may be formed up to an edge formed by the one surface of the ceramic body and each of end surfaces thereof in an x-direction, in which the first and second external electrodes, having a predetermined interval therebetween, are formed.

The first external electrode or the second external electrode may not be formed up to an edge formed by the one surface of the ceramic body and each of end surfaces thereof in an x-direction, in which the first and second external electrodes, having a predetermined interval therebetween, are formed.

The first external electrode or the second external electrode may be formed to have a predetermined height on the side surface of the ceramic body in the y-direction.

The insulation layer may have a height lower than that of the first external electrode and that of the second external electrode measured from the one surface of the ceramic body.

The first and second external electrodes may be extended from the one surface of the ceramic body to the side surfaces thereof in the y-direction and to the other surface of the ceramic body opposing the one surface of the ceramic body.

The first internal electrode may have at least two lead-out portions, and the at least two exposed portions of the first internal electrode may form overlapping areas with the lead-out portion of the second internal electrode.

The first internal electrode may have at least two lead-out portions exposed to the same surface of the ceramic body, and the at least two lead-out portions of the first internal electrode may form overlapping areas with the lead-out portion of the second internal electrode.

The multilayer ceramic capacitor may further include a third external electrode connected to a respective lead-out portion of the first internal electrode, wherein the first internal electrode may have two lead-out portions, and the two lead-out portions of the first internal electrode may form overlapping areas with the lead-out portion of the second internal electrode.

The multilayer ceramic capacitor may further include a third external electrode connected to a respective lead-out portion of the first internal electrode, wherein the first internal electrode may have two lead-out portions, the two lead-out portions of the first internal electrode may form overlapping areas with the lead-out portion of the second internal electrode, and the third external electrode may be extended onto the side surfaces of the ceramic body in the y-direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 1A:
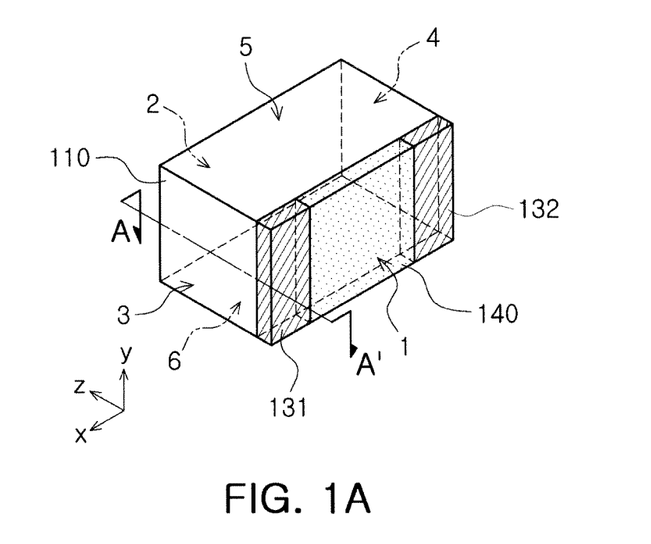
FIGS. 1A and 1B are schematic perspective views showing a multilayer ceramic capacitor according to an embodiment of the present invention.
Figure 1B:
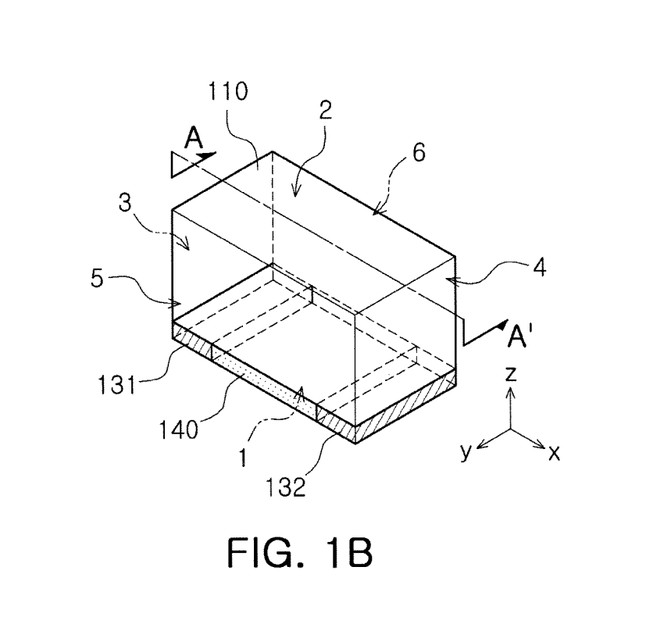
Figure 2:
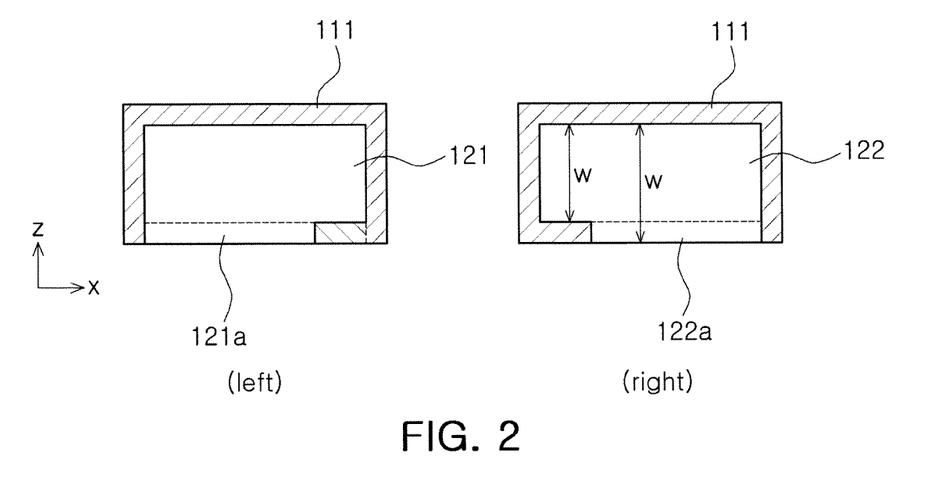
FIGS. 2 and 3 are, respectively, cross-sectional views showing a structure of internal electrodes of the multilayer ceramic capacitor shown in FIGS. 1A and 1B and cross-sectional views taken along line A-A' of FIGS. 1A and 1B.
Figure 3:
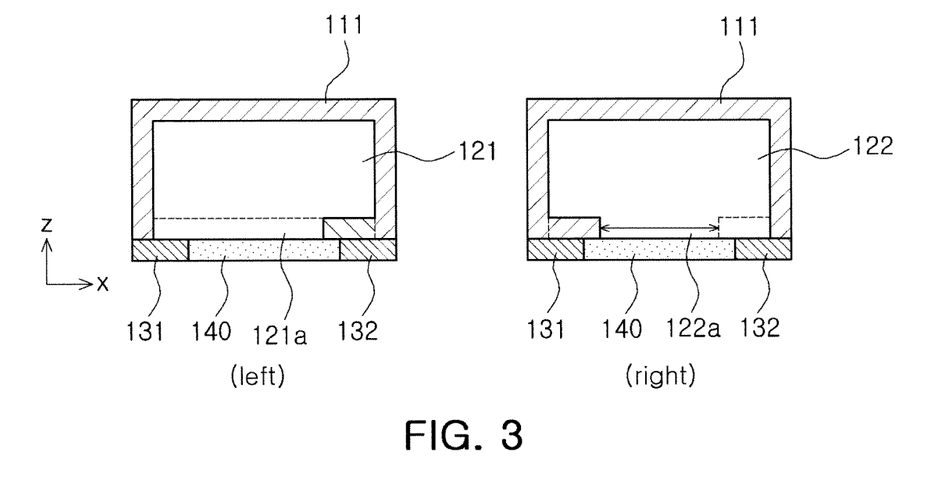

FIGS. 1A and 1B are schematic perspective views showing a multilayer ceramic capacitor according to an embodiment of the present invention. FIG. 2 is cross-sectional views showing a structure of internal electrodes of the multilayer ceramic capacitor shown in FIGS. 1A and 1B. FIG. 3 is cross-sectional views taken along line A-A' of FIGS. 1A and 1B.

The multilayer ceramic capacitor according to the present embodiment may be a two-terminal vertically laminated or vertical multilayer capacitor. Here, "vertically laminated or vertical multilayer capacitor" means that internal electrodes laminated within a capacitor are disposed perpendicularly to a mounting surface of a circuit board, and "two-terminal" means that two terminals are connected to the circuit board as the capacitor terminals.

Referring to FIGS. 1A through 3, the multilayer ceramic capacitor according to the present embodiment may include a ceramic body 110; internal electrodes 121 and 122 formed in the ceramic body; and an insulation layer 140 and external electrodes 131 and 132 formed on one surface of the ceramic body.

According to the present embodiment, the ceramic body 110 may have first and second surfaces 1 and 2 opposing each other, and third to sixth surfaces 3 to 6 connecting the first and second surfaces 1 and 2 to each other. The shape of the ceramic body 110 is not particularly limited but may be a rectangular parallelepiped having first to sixth surfaces, as shown. According to the embodiment of the present invention, the first surface 1 of the ceramic body may be a mounting surface disposed on a mounting area of a circuit board.

According to the embodiment of the present invention, an x-direction refers to a direction in which first and second external electrodes, having a predetermined interval therebetween, are formed; a y-direction refers to a direction in which the internal electrodes, having dielectric layers interposed therebetween, are laminated; and a z-direction refers to a direction in which the internal electrodes are mounted on the circuit board.

According to the embodiment of the present invention, the ceramic body 110 may be formed by laminating a plurality of dielectric layers 111. The plurality of dielectric layers 111 configuring the ceramic body 110 may be in a sintered state and may be integrated such that boundaries therebetween may not be readily apparent.

The dielectric layer 111 may be formed by firing a ceramic green sheet containing a ceramic powder, an organic solvent, and an organic binder. Here, the ceramic powder may have a high dielectric constant, and a barium titanate ($BaTiO_3$) based material, a strontium titanate ($SrTiO_3$) based material, or the like, may be used therefor. However, the ceramic powder is not limited thereto.

According to the embodiment of the present invention, the ceramic body 110 may include the internal electrodes formed therein. FIG. 2 is a cross-sectional view showing the dielectric layer 111 configuring the ceramic body 110 and the internal electrodes 121 and 122 formed on the dielectric layer. According to the embodiment of the present invention, the first internal electrode 121 having a first polarity and the second internal electrode 122 having a second polarity may be formed as a pair and be disposed to face each other in the y-direction, having the dielectric layer 111 interposed therebetween. According to the embodiment of the present invention, the first and second internal electrodes 121 and 122 may be disposed perpendicularly to the mounting surface, that is, the first surface 1, of the multilayer ceramic capacitor.

According to the embodiment of the present invention, the first and second internal electrodes may be made of a conductive paste containing a conductive metal. The conductive metal may be Ni, Cu, Pd, or an alloy thereof, but is not limited thereto.

The internal electrode may be printed on a ceramic green sheet configuring the dielectric layer using a conductive paste through a printing method such as a screen printing method or a gravure printing method. The ceramic green sheets having the internal electrodes printed thereon may be alternately laminated and fired to thereby form the ceramic body.

Referring to FIG. 2, the first and second internal electrodes 121 and 122 have respective first and second lead-out portions 121a and 122a so as to be connected to the external electrodes having different polarities. The first and second lead-out portions 121a and 122a may be exposed to the first surface of the ceramic body. The multilayer ceramic capacitor according to the embodiment of the present invention may be a vertically laminated or vertical multilayer capacitor, the first and second lead-out portions 121a and 122a may be exposed to the same surface of the ceramic body.

According to the embodiment of the present invention, the lead-out portion of the internal electrode is an area in which a conductor pattern forming the internal electrode has an increased width W to thereby be exposed to one surface of the ceramic body.

Generally, the first and second internal electrodes form capacitance in an overlapping area, and the lead-out portions connected to the external electrodes having different polarities do not have an overlapping area. However, according to the embodiment of the present invention, the first and second lead-out portions 121a and 122a may have an overlapping area. According to the embodiment of the present invention, the first and second lead-out portions are exposed to the first surface, and the exposed areas may be partially overlapped.

Referring to FIG. 3, the first external electrode 131 may be formed to be connected to the first lead-out portion 121a of the first internal electrode exposed to the first surface of the ceramic body, and the second external electrode 132 may be formed to be connected to the second lead-out portion 122a of the second internal electrode exposed to the first surface of the ceramic body.

The first external electrode 131 may be connected to a portion of the first lead-out portion 121a that does not overlap the second lead-out portion 122a, and the second external electrode 132 may be connected to a portion of the second lead-out portion 122a that does not overlap the first lead-out portion 121a.

The first external electrode 131 may be connected to the portion of the first lead-out portion 121a so as not to contact the second lead-out portion 122a, and the second external electrode 132 may be connected to the portion of the second lead-out portion 122a so as not to contact the first lead-out portion 121a.

In the right view of FIG. 3, an overlapping area between the lead-out portion of the first internal electrode and the lead-out portion 122a of the second internal electrode is denoted by an arrow, and the lead-out portion 122a of the second internal electrode that does not overlap the lead-out portion of the first internal electrode is denoted by a dotted line.

According to the embodiment of the present invention, the first and second lead-out portions 121a and 122a may have the overlapping area, and be connected to the first and second external electrodes 131 and 132 having different polarities, respectively.

According to the embodiment of the present invention, the first and second external electrodes 131 and 132 may be formed up to an edge formed by the first and third surfaces of the ceramic body and an edge formed by the first and fourth surfaces thereof, respectively.

According to the embodiment of the present invention, the insulation layer 140 may be formed on the first surface of the ceramic body. The insulation layer 140 may be formed between the first and second external electrodes 131 and 132. When being formed to cover the first and second lead-out portions 121a and 122a exposed to the first surface, the insulation layer 140 may entirely cover the overlapping area between the first and second lead-out portions.

The insulation layer 140 may be formed to completely cover one surface of the ceramic body between the first and second external electrodes.

In addition, although not shown, according to the embodiment of the present invention, the insulation layer may only cover the overlapping area between the first and second lead-out portions while having predetermined intervals from the first and second external electrodes 131 and 132.

According to the embodiment of the present invention, the insulation layer 140 may be made of a ceramic slurry. A position and a height of the insulation layer may be adjusted with reference to an amount and a shape of the ceramic slurry. The insulation layer 140 may be formed by applying a ceramic slurry to the ceramic body formed by a firing process and then firing the ceramic slurry.

Alternatively, the insulation layer 140 may be formed by forming a ceramic slurry for the insulation layer on the ceramic green sheet configuring the ceramic body and then firing the ceramic slurry together with the ceramic green sheet.

A method of forming the ceramic slurry is not particularly limited. For example, the ceramic slurry may be sprayed by a spray method or may be applied using a roller.

The insulation layer 140 covers the lead-out portions 121a and 122b of the first and second internal electrodes exposed to one surface of the ceramic body, whereby a short-circuit between the internal electrodes may be prevented and internal defects such as a deterioration in humidity resistance characteristics, or the like, may be prevented.

According to the embodiment of the present invention, since even the lead-out portions of the first and second internal electrodes are overapped, capacitance of the multilayer ceramic capacitor may be increased. In addition, a distance between the first and second internal electrodes to which external polarities are applied may be relatively close, such that a current loop may be shortened. Therefore, equivalent series inductance (ESL) may be reduced.

In a case in which a multilayer ceramic capacitor has external electrodes only formed on one surface thereof, a mounting area is reduced, whereby circuit board mounting density may be improved. However, when the external electrodes are only formed on one surface of the multilayer ceramic capacitor, contact areas between the external electrodes and the circuit board may be reduced. In this case, at the time of mounting the external electrodes on the circuit board, the contact areas between the external electrodes and solders are reduced, such that the mounting of the multilayer ceramic capacitor may be unstable and adhesion strength thereof may be deteriorated.

However, in a case in which an area of the external electrodes is extended, as shown in the embodiment of the present invention, the contact areas between the solders and the external electrodes may be increased. Therefore, the mounting of the multilayer ceramic capacitor may be stably performed, and the adhesion strength thereof may be improved.

According to the embodiment of the present invention, the structure of the external electrodes may be variously realized.

Figure 4:
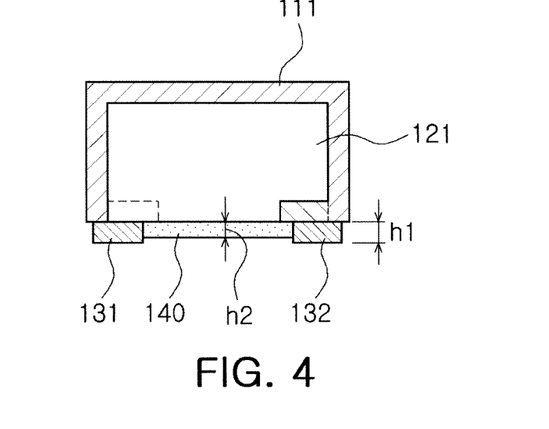
FIG. 4 is a cross-sectional view showing a multilayer ceramic capacitor according to another embodiment of the present invention.

FIG. 4 is a cross-sectional view showing a multilayer ceramic capacitor according to another embodiment of the present invention. Hereinafter, components different from those of the above-mentioned embodiment may mainly be described and detailed descriptions of the same components will be omitted.

Referring to FIG. 4, first and second external electrodes 131 and 132 may be formed on a first surface of a ceramic body and an insulation layer 140 may be formed therebetween, similar to FIG. 3.

According to the present embodiment, the insulation layer 140 may have a height h2, lower than a height h1 of the first external electrode 131 or the second external electrode 132.

The heights of the insulation layer and the external electrodes may be measured based on a mounting surface, that is, the first surface.

According to the present embodiment, the height of the insulation layer is lower than those of the first and second external electrodes, such that an exposure area of the external electrodes may be increased. Therefore, contact areas between solders and the external electrodes are increased, such that the multilayer ceramic capacitor may be more stably mounted on a circuit board.

In addition, as shown in FIG. 4, the first and second external electrodes 131 and 132 may be formed on portions of the first surface of the ceramic body. The first and second external electrodes may not be extended up to an edge formed by first and third surfaces of the ceramic body or an edge formed by first and fourth surfaces thereof, on the first surface of the ceramic body. Here, the third and fourth surfaces may be end surfaces in an x-direction in which the first and second external electrodes, having a predetermined interval therebetween, are formed.

Although not shown, according to the embodiment of the present invention, the first and second external electrodes may be extended from the first surface of the ceramic body onto a side thereof, such as a fifth surface and/or a sixth surface connected to the first surface.

Figure 5:
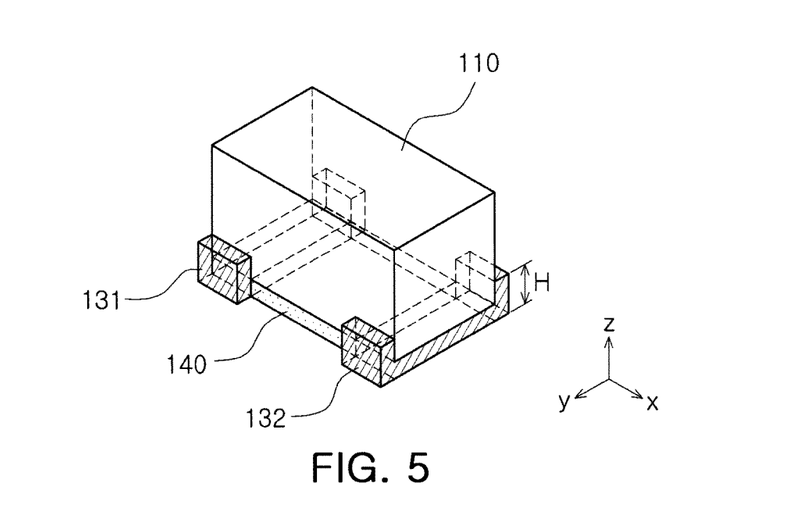
FIGS. 5 and 6 are schematic perspective views showing a multilayer ceramic capacitor according to another embodiment of the present invention.
Figure 6:
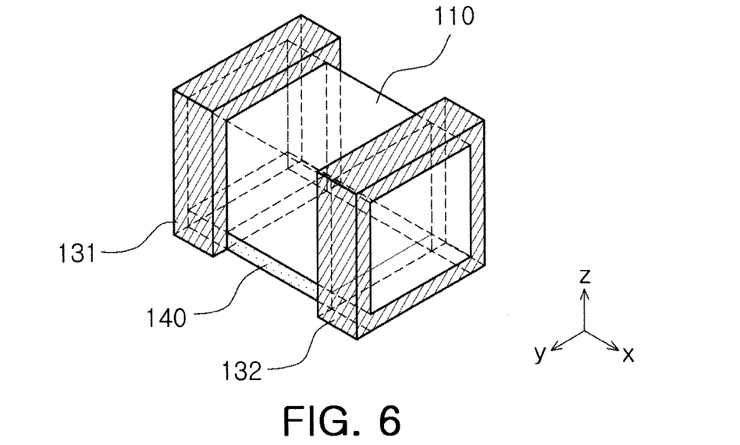

FIGS. 5 and 6 are schematic perspective views showing a multilayer ceramic capacitor according to another embodiment of the present invention. Hereinafter, components different from those of the above-mentioned embodiments may mainly be described and detailed descriptions of the same components will be omitted.

Referring to FIGS. 5 and 6, a ceramic body 110 according to the present embodiment may have a first surface provided as a mounting surface, a second surface opposing the first surface, and third to sixth surfaces connecting the first and second surfaces to each other, similar to the multilayer ceramic capacitor shown in FIG. 1. The third and fourth surfaces may oppose each other, and the fifth and sixth surfaces may oppose each other.

According to the embodiment of the present invention, first and second external electrodes 131 and 132 may be extended from the first surface of the ceramic body to the fifth and sixth side surfaces connected to the first surface.

Referring to FIG. 5, the first and second external electrodes 131 and 132 may be extended from the mounting surface of the ceramic body to side surfaces thereof, and more specifically, be extended from the first surface of the ceramic body to the fifth and sixth surfaces thereof. The fifth and sixth surfaces may oppose each other. The first and second external electrodes 131 and 132 may be extended in a y-direction in which internal electrodes, having dielectric layers interposed therebetween, are laminated, and may then be extended from the first surface of the ceramic body to the fifth and sixth surfaces thereof.

The first and second external electrodes 131 and 132 may be formed at a predetermined height H on the fifth and sixth surfaces. The predetermined height is not particularly limited. As shown in FIG. 5, the first and second external electrodes may only be formed on a portion of the fifth and sixth surfaces.

In addition, although not shown, the first and second external electrodes 131 and 132 may be formed up to top edges of the fifth and sixth surfaces, be extended to only one of the fifth and sixth surfaces, or be formed at different heights on each of the fifth and sixth surfaces.

Further, according to the embodiment of the present invention, the external electrodes may not be formed on the third and fourth end surfaces in the x-direction in which the first and second external electrodes, having a predetermined interval therebetween, are formed.

In addition, the first and second external electrodes 131 and 132 may be formed up to an edge formed by the first and third surfaces of the ceramic body or an edge formed by the first and fourth surfaces thereof, on the first surface.

Alternatively, the first and second external electrodes may not be extended up to the edge formed by the first and third surfaces of the ceramic body or the edge formed by the first and fourth surfaces thereof, on the first surface, as shown in FIG. 4.

Referring to FIG. 6, the first and second external electrodes 131 and 132 may be extended from the first surface of the ceramic body to side surfaces in the y-direction in which the internal electrodes, having dielectric layers interposed therebetween, are laminated, and may then be extended from the side surfaces to the second surface opposing the first surface. More specifically, the first and second external electrodes may be extended from the first surface provided as the mounting surface of the ceramic body to the fifth and sixth surfaces and may then be extended to the second surface opposing the first surface, such that they may have a ring shape. Further, the external electrodes may not be formed on the third and fourth end surfaces in the x-direction in which the first and second external electrodes, having a predetermined interval therebetween, are formed.

In addition, although not shown, the first and second external electrodes may be extended to the fifth and sixth surfaces and the second surface, but may only be formed on a portion of the second surface.

According to the embodiment of the present invention, when the external electrodes are extended to the side of the ceramic body, contact areas between solders and the external electrodes may be increased. The external electrodes formed on the side are coupled to the solders, such that the mounting of the multilayer ceramic capacitor may be stably performed and the adhesion strength of the multilayer ceramic capacitor may be improved.

Figure 7:
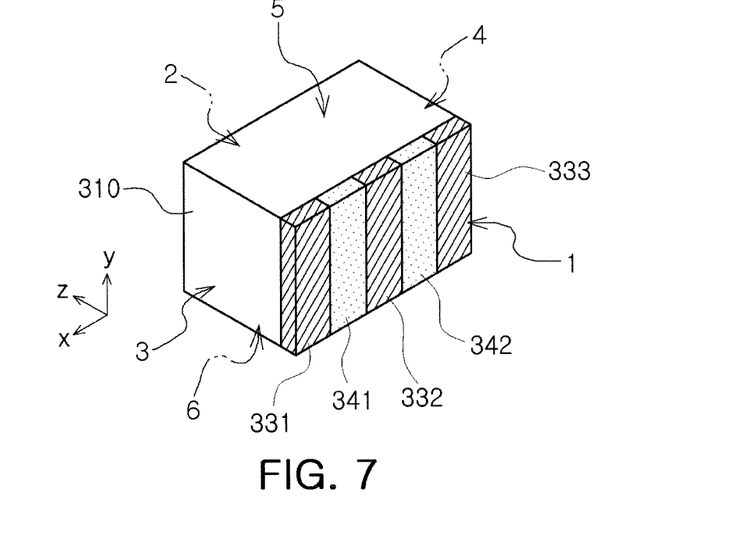
FIG. 7 is a schematic perspective view showing a multilayer ceramic capacitor according to another embodiment of the present invention.
Figure 8:
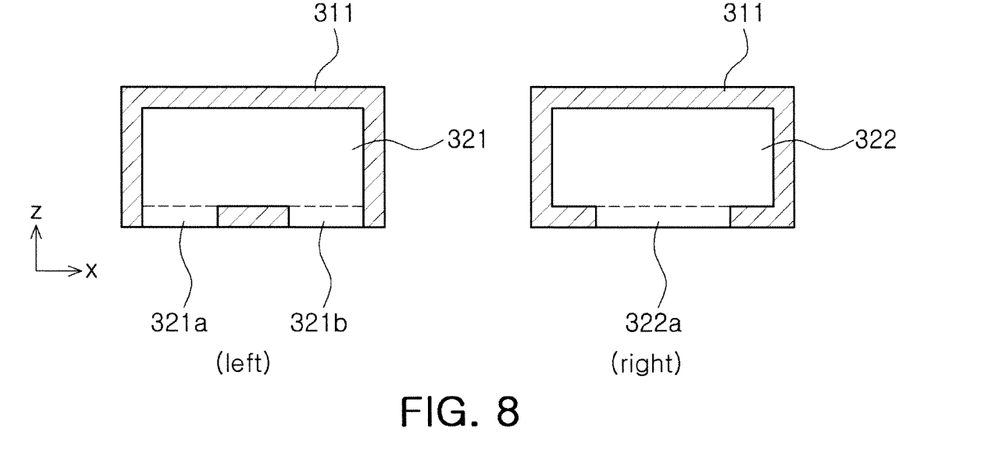
FIGS. 8 and 9 are, respectively, cross-sectional views showing a structure of internal electrodes of the multilayer ceramic capacitor shown in FIG. 7 and cross-sectional views of the multilayer ceramic capacitor shown in FIG. 7.
Figure 9:
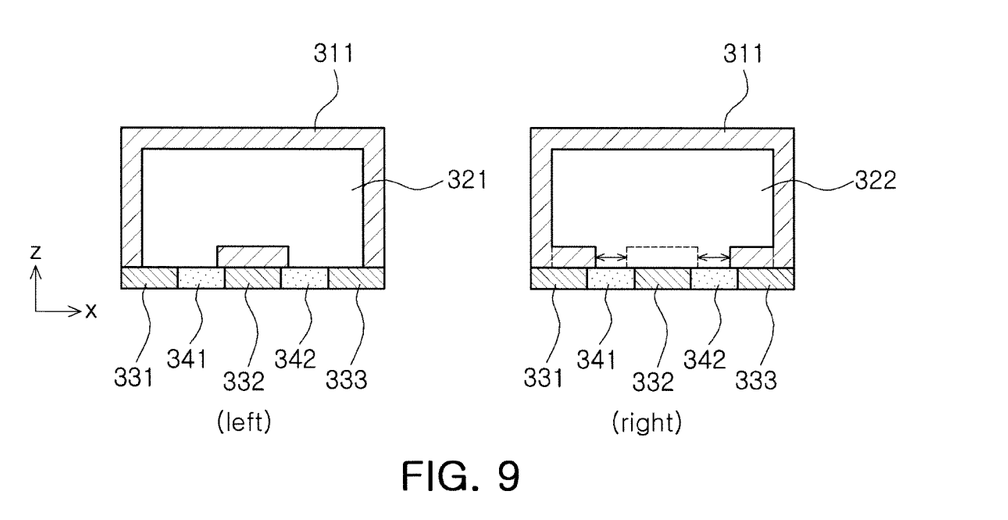

FIGS. 7 through 9 show a multilayer ceramic capacitor according to another embodiment of the present invention. FIG. 7 is a schematic perspective view showing the multilayer ceramic capacitor according to the present embodiment; FIG. 8 is a cross-sectional view showing a structure of internal electrodes of the multilayer ceramic capacitor shown in FIG. 7; and FIG. 9 is a cross-sectional view of the multilayer ceramic capacitor shown in FIG. 7. Hereinafter, components different from those of the above-mentioned embodiments may mainly be described and detailed descriptions of the same components will be omitted.

Referring to FIGS. 7 through 9, the multilayer ceramic capacitor according to the present embodiment may be a three-terminal vertically laminated or vertical multilayer capacitor. Here, "three-terminal" means that three terminals are connected to a circuit board as the capacitor terminals.

The multilayer ceramic capacitor according to the present embodiment may include a ceramic body 310; internal electrodes 321 and 322 formed in the ceramic body; and insulation layers 341 and 342 and external electrodes 331, 332, and 333 formed on one surface of the ceramic body.

According to the present embodiment, the ceramic body 310 may have first and second surfaces 1 and 2 opposing each other, and third to sixth surfaces 3 to 6 connecting the first and second surfaces 1 and 2 to each other. The shape of the ceramic body 310 is not particularly limited, but may be a rectangular parallelepiped shape having the first to six surfaces as shown. According to the embodiment of the present invention, the first surface 1 of the ceramic body may be a mounting surface disposed at a mounting area of the circuit board. The third and fourth surfaces 3 and 4 may be end surfaces in an x-direction in which external electrodes, having a predetermined interval therebetween, are formed, and the fifth and sixth surfaces 5 and 6 may be side surfaces in a y-direction in which internal electrodes, having dielectric layers interposed therebetween, are laminated.

FIG. 8 is a cross-sectional view showing a dielectric layer 311 configuring the ceramic body 310 and the internal electrodes 321 and 322 formed on the dielectric layer. According to the embodiment of the present invention, the first internal electrode 321 having a first polarity and the second internal electrode 322 having a second polarity may be formed as a pair and be disposed to face each other in the y-direction, having the dielectric layer 311 interposed therebetween. According to the embodiment of the present invention, the first and second internal electrodes 321 and 322 may be disposed perpendicularly to the mounting surface of the multilayer ceramic capacitor.

Referring to FIG. 8, the first and second internal electrodes 321 and 322 have respective first and second lead-out portions 321a, 321b, and 322a so as to be connected to the external electrodes having different polarities. The first and second lead-out portions 321a, 321b, and 322a may be exposed to one surface of the ceramic body.

According to the present embodiment, the first internal electrode may have the two first lead-out portions 321a and 321b. Each of the two first lead-out portions 321a and 321b of the first internal electrode may have an area overlapping the second lead-out portion 322a of the second internal electrode. According to the embodiment of the present invention, the first lead-out portions 321a and 321b of the first internal electrode and the second lead-out portion 322a of the second internal electrode may be exposed to the same surface of the ceramic body, and the exposed areas may be partially overlapped.

Referring to FIG. 9, the first and third external electrodes 331 and 333 may be formed on one surface of the ceramic body so as to be connected to the two first lead-out portions 321a and 321b of the first internal electrode exposed to one surface of the ceramic body. According to the present embodiment, the first internal electrode may be connected to an external polarity by the first and third external electrodes. In addition, the second external electrode 332 may be formed to be connected to the second lead-out portion 322a of the second internal electrode exposed to one surface of the ceramic body. The second external electrode 332 may be formed between the first and third external electrodes 331 and 333. In the present invention, the first and second electrodes may have different polarities, and the first and third electrodes may have the same polarity.

The first external electrode 331 may be connected to a portion of the first lead-out portion 321a that does not overlap the second lead-out portion 322a, and the third external electrode 333 may be connected to a portion of the first lead-out portion 321b that does not overlap the second lead-out portion 322a. The second external electrode 332 may be connected to a portion of the second lead-out portion 322a that does not overlap the two first lead-out portions 321a and 321b.

In the right view of FIG. 9, overlapping areas between the two lead-out portions of the first internal electrode and the lead-out portion of the second internal electrode 322 are denoted by arrows, and the lead-out portion of the second internal electrode 322 that does not overlap the two lead-out portions of the first internal electrode is denoted by a dotted line.

According to the embodiment of the present invention, the first and third external electrodes 331 and 333 may be formed up to an edge formed by the first and third surfaces of the ceramic body and an edge formed by the first and fourth surfaces thereof, on the first surface.

Alternatively, although not shown, the first and third external electrodes may not be formed up to the edge formed by the first and third surfaces of the ceramic body and the edge formed by the first and fourth surfaces thereof, on the first surface, as shown in FIG. 4.

According to the present embodiment, the insulation layers 341 and 342 may be formed on one surface of the ceramic body. The insulation layers 341 and 342 may be formed between the first and second external electrodes 331 and 332 and between the second and third external electrodes 332 and 333, respectively. When being formed to cover the first and second lead-out portions 321a, 321b and 322a exposed to one surface of the ceramic body, the insulation layers 341 and 342 may entirely cover the overlapping areas between the first and second lead-out portions.

The insulation layers 341 and 342 cover the lead-out portions 321a, 321b, and 322a of the first and second internal electrodes exposed to one surface of the ceramic body, whereby a short-circuit between the internal electrodes may be prevented and internal defects such as a deterioration in humidity resistance characteristics, or the like, may also be prevented.

According to the present embodiment, since even the lead-out portions of the first and second internal electrodes are overlapped, capacitance of the multilayer ceramic capacitor may be increased. In addition, a distance between the first and second internal electrodes to which external polarities are applied may be relatively close, such that a current loop may be shortened. Therefore, ESL may be reduced.

Further, according to the present embodiment, current flows to the second internal electrode through the first internal electrode connected to the first and third external electrodes. Due to this current flow, a magnitude of an inductance component connected in series with a capacitance component of the multilayer ceramic capacitor may be significantly reduced.

In a case in which the multilayer ceramic capacitor has the external electrodes only formed on one surface thereof, a mounting area is reduced, whereby circuit board mounting density may be improved. However, contact areas between the external electrodes and the circuit board are reduced, such that the mounting of the multilayer ceramic capacitor may be unstable and adhesion strength thereof may be deteriorated.

However, a structure of the external electrodes may be variously changed as described in the embodiment of the present invention, thereby increasing the contact areas between the solders and the external electrodes.

Figure 10:
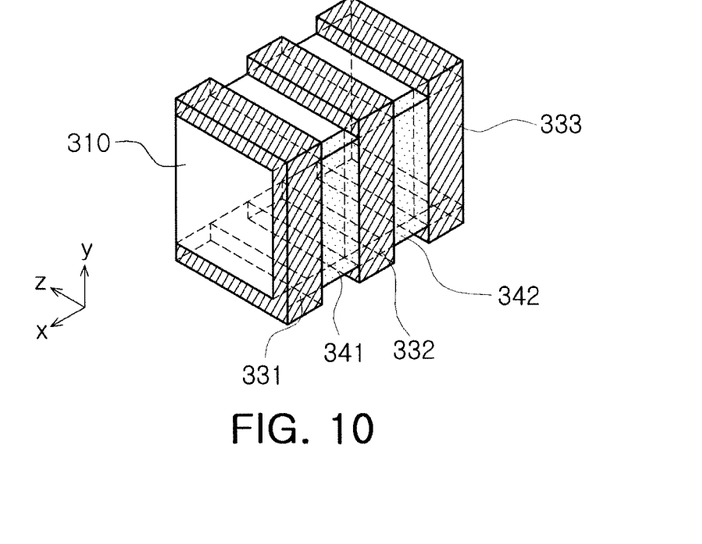
FIGS. 10 through 12 are schematic perspective views showing a multilayer ceramic capacitor according to another embodiment of the present invention.
Figure 11:
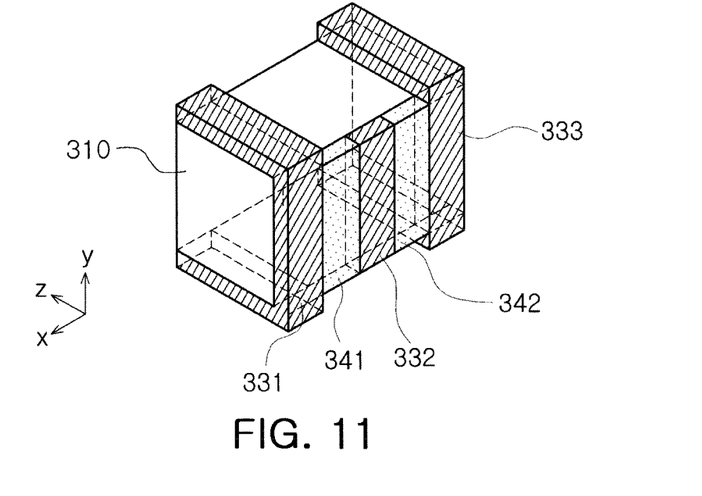
Figure 12:
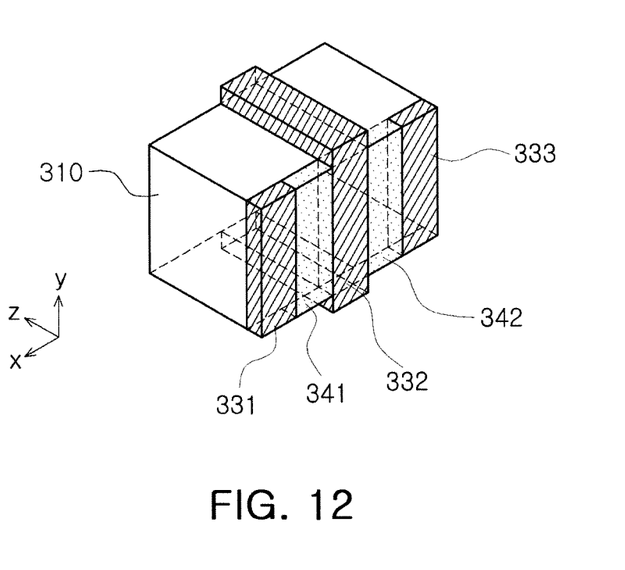

FIGS. 10 through 12 are schematic perspective views showing a multilayer ceramic capacitor according to another embodiment of the present invention. Hereinafter, components different from those of the above-mentioned embodiments may mainly be described and detailed descriptions of the same components will be omitted.

Referring to FIGS. 10 through 12, a ceramic body 310 according to the present embodiment may have a first surface provided as a mounting surface, a second surface opposing the first surface, and third to sixth surfaces connecting the first and second surfaces to each other, similar to the multilayer ceramic capacitor shown in FIG. 7. The third and fourth surfaces may oppose each other, and the fifth and sixth surfaces may oppose each other. The third and fourth surfaces may be end surfaces in an x-direction in which first and second external electrodes, having a predetermined interval therebetween, are formed, and the fifth and sixth surfaces may be side surfaces in a y-direction in which internal electrodes, having dielectric layers interposed therebetween, are laminated.

Referring to FIGS. 10 through 12, first and third external electrodes 331 and 333 may be formed on one surface of a ceramic body so as to be connected to two first lead-out portions of a first internal electrode exposed to one surface of the ceramic body, and a second external electrode 332 may be formed to be connected to a second lead-out portion of a second internal electrode exposed to one surface of the ceramic body, similar to the multilayer ceramic capacitor shown in FIG. 7. The second external electrode 332 may be formed between the first and third external electrodes 331 and 333.

According to the embodiment of the present invention, the external electrodes may be extended from the first surface of the ceramic body to the fifth and sixth surfaces thereof. FIGS. 10 through 12 show different structures of the external electrodes in a three-terminal capacitor according to various embodiments of the invention.

Referring to FIG. 10, the first to third external electrodes 331, 332, and 333 may be extended from the mounting surface of the ceramic body to the side surfaces thereof, and more specifically, be extended from the first surface of the ceramic body to the fifth and sixth surfaces thereof. As shown in FIG. 10, the first to third external electrodes 331, 332, and 333 may be extended from the first surface of the ceramic body to the fifth and sixth surfaces thereof and may then be extended up to an edge formed by the second and fifth surfaces or an edge formed by the second and sixth surfaces.

Further, according to the embodiment of the present invention, the external electrodes may not be formed on the third and fourth end surfaces in the x-direction in which the external electrodes, having a predetermined interval therebetween, are formed. The first and third external electrodes 331 and 333 may be formed up to an edge formed by the first and third surfaces of the ceramic body or an edge formed by the first and fourth surfaces thereof, on the first surface of the ceramic body.

Alternatively, the external electrodes may not be formed up to the edge formed by the first and third surfaces of the ceramic body or the edge formed by the first and fourth surfaces thereof, on the first surface, as shown in FIG. 4.

According to the embodiment of the present invention, as shown in FIG. 11, the first and third external electrodes 331 and 333 may be extended from the mounting surface of the ceramic body to the side surfaces thereof, and the second external electrode 332 may only be formed on the mounting surface of the ceramic body.

According to the embodiment of the present invention, as shown in FIG. 12, the second external electrode 332 may be extended from the mounting surface of the ceramic body to the side surfaces thereof, and the first and third external electrodes 331 and 333 may only be formed on the mounting surface of the ceramic body.

As shown in FIGS. 11 and 12, the first to third external electrodes may have various structures by changing surfaces to which they are extended, heights thereof, or the like. In addition, the first to third external electrodes may have a ring shape, as shown in FIG. 6.

According to the embodiment of the present invention, when the external electrodes are extended to the side surfaces of the ceramic body, contact areas between solders and the external electrodes may be increased. The external electrodes formed on the side surfaces are coupled to the solders, such that the mounting of the multilayer ceramic capacitor may be stably performed and the adhesion strength thereof may be improved.

In addition, although not shown, the first or second internal electrode may include at least two lead-out portions. In addition, the first and second internal electrodes may include overlapping lead-out portions having different polarities. Further, the lead-out portions formed in the first and second internal electrodes may be exposed to the same surface of the ceramic body or may be exposed to different surfaces thereof. The number, positions, and the like, of the lead-out portions formed in the internal electrode may be variously adjusted by those skilled in the art. In addition, extension structures, positions, and the like, of the external electrodes, may be variously adjusted.

As set forth above, according to the embodiments of the present invention, even the lead-out portions of the first and second internal electrodes are overapped, such that the capacitance of the multilayer ceramic capacitor may be increased.

In addition, a distance between the first and second internal electrodes to which external polarities are applied may be relatively close, such that a current loop may be shortened. Therefore, equivalent series inductance (ESL) may be reduced.

According to the embodiments of the present invention, the insulation layer formed on the ceramic body covers the lead-out portions of the first and second internal electrodes exposed to one surface of the ceramic body, whereby a short-circuit between the internal electrodes may be prevented and internal defects such as a deterioration in humidity resistance characteristics, or the like, may be prevented.

According to the embodiments of the present invention, the height of the insulation layer may be adjusted. When the height of the insulation layer is lower than those of the first and second external electrodes, the multilayer ceramic capacitor may be more stably mounted on the circuit board.

According to the embodiments of the present invention, when the overall area of the external electrodes is extended, the contact areas between the solders and the external electrodes may be increased. Therefore, the mounting of the multilayer ceramic capacitor may be stably performed, and the adhesion strength thereof may be improved.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
    a ceramic body;
    first and second internal electrodes including first and second lead-out portions respectively, the first and second lead-out portions having an overlapping area with each other, the overlapping area being exposed to one surface of the ceramic body;
    first and second external electrodes extended from the one surface of the ceramic body to side surfaces thereof in a y-direction, in which the first and second internal electrodes are laminated, and connected to the respective lead-out portions; and
    an insulation layer formed on the one surface of the ceramic body, wherein:
    the first lead out portion extends from a first end of the first internal electrode and terminates at one end of the overlapping area, and the second lead out portion extends from a second end of the second internal electrode and terminates at the other end of the overlapping area, the second end of the second internal electrode being opposite to the first end of the first internal electrode, and the first external electrode or the second external electrode is formed up to an edge formed by the one surface of the ceramic body and each of end surfaces thereof in an x direction, in which the first and second external electrodes, having a predetermined interval therebetween, are formed, the length of the overlapping area of the respective lead-out portions is greater than the width of the first or second external electrodes disposed on the one surface of the ceramic body.

2. The multilayer ceramic capacitor of claim 1, wherein the lead-out portions of the first and second internal electrodes are exposed to the same surface of the ceramic body.

3. The multilayer ceramic capacitor of claim 1, wherein the first and second internal electrodes are disposed perpendicularly to a mounting surface of the ceramic body.

4. The multilayer ceramic capacitor of claim 1, wherein the first external electrode is connected to a portion of the lead-out portion of the first internal electrode that does not overlap the lead-out portion of the second internal electrode.

5. The multilayer ceramic capacitor of claim 1, wherein the insulation layer entirely covers the overlapping area of the lead-out portions of the first and second internal electrodes.

6. The multilayer ceramic capacitor of claim 1, wherein the insulation layer is formed by applying a ceramic slurry to the ceramic body.

7. The multilayer ceramic capacitor of claim 1, wherein the side surfaces of the ceramic body in the y-direction oppose each other.

8. The multilayer ceramic capacitor of claim 1, wherein the first external electrode or the second external electrode is not formed on an end surface of the ceramic body in an x-direction, in which the first and second external electrodes, having a predetermined interval therebetween, are formed.

9. The multilayer ceramic capacitor of claim 1, wherein the first external electrode or the second external electrode is formed to have a predetermined height on the side surface of the ceramic body in the y-direction.

10. The multilayer ceramic capacitor of claim 1, wherein the first and second external electrodes are extended from the one surface of the ceramic body to the side surfaces thereof in the y-direction and to the other surface of the ceramic body opposing the one surface of the ceramic body.

11. The multilayer ceramic capacitor of claim 1, wherein the first internal electrode has at least two lead-out portions, and the at least two lead-out portions of the first internal electrode form overlapping areas with the lead-out portion of the second internal electrode.

12. The multilayer ceramic capacitor of claim 1, wherein the first internal electrode has at least two lead-out portions exposed to the same surface of the ceramic body, and the at least two lead-out portions of the first internal electrode form overlapping areas with the lead-out portion of the second internal electrode.

13. The multilayer ceramic capacitor of claim 1, further comprising a third external electrode connected to a respective lead-out portion of the first internal electrode, wherein the first internal electrode has two lead-out portions, and the two lead-out portions of the first internal electrode form overlapping areas with the lead-out portion of the second internal electrode.

14. The multilayer ceramic capacitor of claim 1, further comprising a third external electrode connected to a respective lead-out portion of the first internal electrode, wherein the first internal electrode has two lead-out portions, the two lead-out portions of the first internal electrode form overlapping areas with the lead-out portion of the second internal electrode, and the third external electrode is extended onto the side surfaces of the ceramic body in the y-direction.

15. A multilayer ceramic capacitor comprising:

a ceramic body;

first and second internal electrodes including first and second lead-out portions respectively, the first and second lead-out portions having an overlapping area with each other, the overlapping area being exposed to one surface of the ceramic body;

first and second external electrodes extended from the one surface of the ceramic body to side surfaces thereof in a y-direction, in which the first and second internal electrodes are laminated, and connected to the respective lead-out portions; and an insulation layer formed on the one surface of the ceramic body, wherein:

the first lead out portion extends from a first end of the first internal electrode and terminates at one end of the overlapping area, and the second lead out portion extends from a second end of the second internal electrode and terminates at the other end of the overlapping area, the second end of the second internal electrode being opposite to the first end of the first internal electrode, the first external electrode or the second external electrode is not formed up to an edge formed by the one surface of the ceramic body and each of end surfaces thereof in an x direction, in which the first and second external electrodes, having a predetermined interval therebetween, are formed, and the length of the overlapping area of the respective lead-out portions is greater than the wide of the first or second external electrodes disposed on the one surface of the ceramic body.

16. A multilayer ceramic capacitor comprising:

a ceramic body;

first and second internal electrodes including respective lead-out portions having an overlapping area with an adjacent lead-out portion, the overlapping area being exposed to one surface of the ceramic body;

first and second external electrodes disposed on the one surface of the ceramic body and connected to the respective lead-out portions; and only one insulation layer disposed on the one surface of the ceramic body, and covering the entirety of the overlapping area of the respective lead-out portions, wherein the length of the overlapping area of the respective lead-out portions is greater than the width of the first or second external electrodes disposed on the one surface of the ceramic body.

17. The multilayer ceramic capacitor of claim 16, wherein the insulation layer has a height lower than those of the first and second external electrodes measured from the one surface of the ceramic body.

18. The multilayer ceramic capacitor of claim 16, wherein the lead-out portions of the first and second internal electrodes are exposed to the same surface of the ceramic body.

19. The multilayer ceramic capacitor of claim 16, wherein the first and second internal electrodes are disposed perpendicularly with respect to a mounting surface of the ceramic body.

20. The multilayer ceramic capacitor of claim 16, wherein the first external electrode is connected to a portion of the lead-out portion of the first internal electrode that does not overlap with the lead-out portion of the second internal electrode.

21. The multilayer ceramic capacitor of claim 16, wherein first and second external electrodes are 2-terminal electrodes.

\* \* \* \* \*